US010927301B2

(12) United States Patent
Muenzenberger et al.

(10) Patent No.: US 10,927,301 B2
(45) Date of Patent: *Feb. 23, 2021

(54) FIRE PROTECTION COMPOSITION AND USE THEREOF

(71) Applicant: Hilti Aktiengesellschaft, Schaan (LI)

(72) Inventors: Herbert Muenzenberger, Wiesbaden (DE); Sebastian Simon, Buchloe Lindenberg (DE); Ingrid Woelfle, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,965

(22) Filed: Jul. 18, 2019

(65) Prior Publication Data

US 2019/0338192 A1 Nov. 7, 2019

Related U.S. Application Data

(63) Continuation of application No. 15/304,169, filed as application No. PCT/EP2015/057574 on Apr. 8, 2015, now Pat. No. 10,400,172.

(30) Foreign Application Priority Data

Apr. 16, 2014 (EP) .................................... 14164845

(51) Int. Cl.
| | | |
|---|---|---|
| C09K 21/04 | (2006.01) | |
| C08L 33/06 | (2006.01) | |
| C09K 21/12 | (2006.01) | |
| C08K 3/34 | (2006.01) | |
| C08K 13/04 | (2006.01) | |
| C08K 3/04 | (2006.01) | |
| C08K 3/32 | (2006.01) | |
| C08K 7/14 | (2006.01) | |
| C08K 7/28 | (2006.01) | |
| C08L 33/00 | (2006.01) | |
| C09J 9/00 | (2006.01) | |
| C09J 133/00 | (2006.01) | |
| C08K 3/36 | (2006.01) | |
| C08K 3/26 | (2006.01) | |
| C08K 3/38 | (2006.01) | |

(52) U.S. Cl.
CPC .............. *C09K 21/04* (2013.01); *C08K 3/04* (2013.01); *C08K 3/32* (2013.01); *C08K 3/34* (2013.01); *C08K 7/14* (2013.01); *C08K 7/28* (2013.01); *C08K 13/04* (2013.01); *C08L 33/00* (2013.01); *C08L 33/06* (2013.01); *C09J 9/00* (2013.01); *C09J 133/00* (2013.01); *C09K 21/12* (2013.01); *C08K 3/26* (2013.01); *C08K 3/36* (2013.01); *C08K 3/38* (2013.01); *C08K 2003/265* (2013.01); *C08K 2003/323* (2013.01); *C08K 2003/387* (2013.01); *C08L 2201/02* (2013.01); *C08L 2201/08* (2013.01); *C08L 2203/162* (2013.01); *C09J 2301/408* (2020.08); *C09J 2433/00* (2013.01)

(58) Field of Classification Search
CPC ... C08K 3/04; C08K 7/28; C08K 3/34; C08K 7/14; C08K 13/04; C08K 3/32; C08K 3/26; C08K 3/36; C08K 3/38; C08K 2003/387; C08K 2003/323; C08K 2003/265; C09K 21/12; C09K 21/04; C08L 33/06; C08L 33/00; C08L 2201/02; C08L 2201/08; C08L 2203/162; C09J 133/00; C09J 9/00; C09J 2205/102; C09J 2433/00; C09J 2301/408
USPC ............................................ 524/35; 252/606
See application file for complete search history.

(56) References Cited

U.S. PATENT DOCUMENTS

| | | | |
|---|---|---|---|
| 5,356,568 A | 10/1994 | Levine | |
| 5,830,319 A | 11/1998 | Landin | |
| 6,001,285 A | 12/1999 | Wunram | |
| 8,465,821 B2 * | 6/2013 | Boucke .............. | E04F 15/181 |
| | | | 428/50 |
| 10,400,172 B2 * | 9/2019 | Muenzenberger ...... | C08L 33/06 |
| 2003/0178220 A1 | 9/2003 | Barusseau et al. | |
| 2004/0054035 A1 | 3/2004 | Hallissy et al. | |
| 2004/0256605 A1 | 12/2004 | Reinheimer et al. | |
| 2009/0326117 A1 | 12/2009 | Benussi et al. | |
| 2011/0319536 A1 * | 12/2011 | Ding ...................... | C08L 67/02 |
| | | | 524/101 |

FOREIGN PATENT DOCUMENTS

| | | |
|---|---|---|
| DE | 1 029 083 | 4/1958 |
| DE | 196 31 813 | 2/1998 |

(Continued)

OTHER PUBLICATIONS

International Search Report (PCT/ISA/210) issued in PCT Application No. PCT/EP2015/057574 dated Jun. 15, 2015, with English translation (four (4) pages).

(Continued)

*Primary Examiner* — Angela C Scott
(74) *Attorney, Agent, or Firm* — Grüneberg and Myers PLLC

(57) ABSTRACT

The invention relates to a fire protection composition comprising: a binder based on an aqueous, or solvent-based polymer dispersion; fire protection additives comprising a physically acting expanding agent, a compound containing phosphorus, selected from among salts or esters of phosphorus oxyacids, and glass fiber; and an acid-resistant, inorganic filler. The invention also relates to the use of said composition as a sealing mass, in particular as a fire protection sealing mass.

7 Claims, No Drawings

(56) References Cited

FOREIGN PATENT DOCUMENTS

| | | |
|---|---|---|
| EP | 0 429 246 | 5/1991 |
| EP | 1 489 136 | 12/2004 |

OTHER PUBLICATIONS

German-language Written Opinion (PCT/ISA/237) issued in PCT Application No. PCT/EP2015/057574 dated Jun. 15, 2015 (four (4) pages).

\* cited by examiner

FIRE PROTECTION COMPOSITION AND USE THEREOF

This application is a continuation application of U.S. application Ser. No. 15/304,169, filed on Oct. 14, 2016, which was the National Stage entry under § 371 of International Application No, PCT/EP2015/057574, filed on Apr. 8, 2015, and which claims the benefit of European Application No. 14164845.1, filed. Apr. 16, 2014, all of which are incorporated in their entireties by reference.

The invention relates to a composition for fire protection applications, in particular a sealing mass based on an aqueous, or solvent-based, polymer dispersion, as well as the use thereof for sealing openings, cable, and pipe feed-throughs in walls, floors, and/or ceilings of buildings, etc.

A series of different sealing products, which are available as sealing masses among other things, are used for fire and smoke seals or barriers of openings, cable, and pipe feed-throughs in walls, floors, and/or ceilings, of joints between parts of ceilings and walls, between masonry openings and structural components that are to be built, such as window and door frames, between ceilings and walls, and between exterior walls and curtain-type façades of buildings for the purpose of heat insulation and/or fire protection.

The sealing masses have a separate area of application with feed-throughs of plastic-insulated single cables, cable bundles, and pipes through openings in walls, floors, and/or ceilings of buildings. They are very frequently used in combination with other prefabricated systems such as blocks or slabs. This area of application relates in particular to sealing openings in which communication cables or piping have already been laid.

For the purpose of fire protection, additives are added to the sealing masses which cause the sealing mass to expand or intumesce at elevated temperatures, such as in the case of fire, for example, thereby forming an insulating layer and, as the case may be, sealing the opening generated by the combustion of plastic piping.

DE 196 31 813 A1 describes such a sealing mass, which intumesces at an elevated ambient temperature, for instance as a result of a fire. The sealing mass contains a binder based on a combination of an acrylate dispersion and an alkyd resin, fire protection additives, including those that produce intumescence, additives for stabilizing the ash crust generated in the case of a fire, so-called ash-crust stabilizers, as well as other additives and fillers.

However, the disadvantage of a binder based on a combination of an aqueous polymer dispersion and an alkyd resin, which is a 75% solution in aromatic hydrocarbons, such as xylene or toluene, is that the shelf life is limited due to the water and the solvent constituents. During storage, the water and the solvent are absorbed by the fillers, or, in the case of packaging in cartridges, are released via the cartridge wall with longer storage. The dispersion can coagulate and break up as a result. The resin becomes incompatible and crystallizes. As a result, the viscosity of the mass increases and the paste-like nature of the composition is lost. This has a very strong effect on the shelf life of the composition.

According to DE 196 31 813 A1, this problem is supposed to be solved by the addition of cellulose, wherein it was assumed that the cellulose binds the water to the dispersion and protects it from coagulation.

The composition, according to Example 1 in DE 196 31 813 A1, also contains, along with the fire protection additive ammonium polyphosphate, zinc borate, glass fibers as ash-crust stabilizers, and inter glia calcium carbonate as a filler, wherein the proportion of zinc borate of approximately 12% by weight is relatively high.

The described composition, therefore, comprises a lot of components, which make the composition very complex and also expensive, in particular because of the high amount of zinc borate.

Furthermore, it is disadvantageous that despite adding cellulose when mixing the components of the composition, the ammonium polyphosphate is partially damaged, wherein a small quantity of fine-particle abrasion develops. Over the storage duration, or due to storage at high temperatures, this abrasion slowly dissolves into the fluid components, hydrolyzes, and releases phosphoric acid. This, in turn, causes the decomposition of acid-labile components, such as the calcium carbonate, while forming carbon dioxide, which leads to a reduced shelf life. This effect is intensified with storage at elevated temperatures.

The object of the invention consists of making available a simplified composition with an increased shelf life, which can be produced more cost-effectively and whose fire protection properties are not affected disadvantageously despite the simplified composition.

The inventors have now discovered that the cellulose does not bind the fluid components in the composition and stabilize the dispersion, as assumed in DE 196 31 813 A1, rather, it functions as a protective colloid, which clearly reduces shearing forces during the mixing process and, thus, damage to the other solid components of the composition, such as the ammonium polyphosphate. However, the addition of the cellulose is not sufficient to prevent complete damage to the solid components, in particular the ammonium polyphosphate, during mixing. Therefore, there is a latent risk that acids form during storage, in particular during storage over a longer period of time and/or at an elevated temperature.

The problem of acid development was hardly observed due to the simultaneous use of zinc borate in the formulation, which partially buffered the acid. Initial storage experiments over a longer period of time at 40° C. showed evidence of a reduced shelf life.

The inventors have now discovered that, starting with the compositions according to DE 196 31 813 A1, it is possible to dispense with both the cellulose as well as the expensive zinc borate, without having to accept losses in terms of fire protection properties, if acid-resistant fillers are used instead of fillers that react with acids, in particular the calcium carbonate.

Surprisingly, the stability of the ash crust formed in the case of fire does not decrease, even without the use of zinc borate, and the fire protection properties did not deteriorate despite the simplified composition of the fire protection additives.

One subject matter of the invention is therefore a composition, comprising a binder based on an aqueous or solvent-based polymer dispersion, fire protection additives comprising a physically acting expanding agent, a compound containing phosphorus, selected from among salts or esters of phosphorus oxyacids, glass fibers, and an acid-resistant, inorganic filler. According to the invention, the composition is free of zinc borate and fillers that can react with acids.

According to the invention, the binder is a water-based or solvent-based polymer dispersion, in particular an aqueous polymer dispersion. Examples of aqueous polymer dispersions which have notably been proven are aqueous acrylate dispersions, aqueous dispersions or emulsions of urea resin, formaldehyde resin or melamine resin, polyvinyl acetates, polyvinyl alcohols, acrylonitrile, styrene acrylics, and copolymers thereof.

The composition according to the invention preferably contains as a binder an aqueous acrylate (copolymer) dispersion, especially preferably an aqueous dispersion of a polyalkyl(meth)acrylate and/or an alkyl(meth)acrylate copolymer. Aqueous dispersions are preferred, which can be obtained by polymerization, namely by emulsion polymerization of alkyl(meth)acrylates and/or by copolymerization of alkyl(meth)acrylates with themselves and/or with copolymerizable comonomers, such as preferably (meth)acrylic acid, (meth)acrylamide, styrene, itaconic acid, acrylonitrile, and/or citraconic acid, wherein the alkyl groups of alkyl (meth)acrylate preferably have 1 to 6 C atoms, more preferably 1 to 4 C atoms. According to the invention, aqueous dispersions of polybutyl acrylate, polyethylhexylacrylate, or alkyl(meth)acrylate styrene copolymers are especially preferred. The acrylate (copolymer) dispersion can contain both homopolymers as well as copolymers or even mixtures of homopolymers and/or copolymers and is thus mixed with the other components preferably with a pH value in the range of 7 to 9, preferably a pH value of 8, which is adjusted if necessary with diluted sodium hydroxide solution or ammonia solution. This aqueous acrylate (copolymer) dispersion preferably has a solids content of 30 to 70% by weight, more preferably of 45 to 65% by weight. The acrylate (copolymer) dispersions that are used according to the invention are known to a person skilled in the art and are commercially available. The hardening takes place physically by drying.

According to the invention, the insulating layer, the ash crust, is formed by a physically acting expanding agent, which causes physical intumescence. Accordingly, the fire protection additive comprises at least one thermally expandable compound, such as a graphite intercalation compound, which is also known as expandable graphite, or a sheet silicate intercalation compound, in particular those with an increased expansion volume, which are also known as expandable sheet silicates.

For example, known intercalation compounds of $SO_x$, $NO_x$, halogen, and/or strong acids in graphite are possible as a graphite intercalation compound (expandable graphite). These are also designated as graphite salts. Expandable graphites that release $SO_2$, $SO_3$, NO, and/or $NO_2$ at temperatures of 120 to 350° C., for example, while swelling, are preferred. The expandable graphite can be present, for example, in the form of lamella with a maximum diameter in the range of 0.1 to 5 mm. Said diameter is preferably in a range of 0.5 to 3 mm. Suitable expandable graphites are commercially available for the present invention. In general, the expandable graphite particles in the fire protection elements according to the invention are uniformly distributed. However, the concentration of expandable graphite particles can also be varied in a punctiform, pattern-like, laminar and/or sandwich-like manner. Reference is made in this regard to EP 1489136 A1, the content of which is herewith incorporated in this application by reference.

Suitable sheet silicate intercalation compounds (expandable sheet silicates) are, for example, those compounds which are obtainable by the incorporation of intercalation compounds in native, expandable sheet silicates, in particular native vermiculite. Preferred as intercalation compounds are representatives of the alcoholates of lithium and potassium and salts of lithium, sodium and potassium with organic acids, which are incorporated into the native sheet silicate by cation exchange. Reference is made in this regard to DE 1029083 A1 as well as to the literature cited therein, e.g., EP 0 429 246 A1, the contents of which is herewith incorporated in this application by reference.

The physically acting expanding agent is contained, preferably, in a quantity of approximately 5 to 20% by weight, preferably 5 to 10% by weight, especially preferably 5 to 7% by weight, related to the total weight of the composition.

Because the ash crust that is formed in the case of fire from the physically acting expanding agent and through the combustion of the binder is too unstable as a rule, and depending on the density and structure thereof, it can already be dispersed by air currents, which has a negative effect on the insulating effect of the coating, at least one ash-crust stabilizer is added to the components just listed.

An "ash-crust stabilizer" is a so-called structure-forming compound, which stabilizes the carbon skeleton (ash crust), which is formed from the physically acting expanding agent and the binder. The principle mode of action thereby, is that the intrinsically very soft carbon layers being generated are mechanically strengthened by inorganic compounds. The addition of such an ash-crust stabilizer contributes to a substantial stabilization of the intumescent crust in the case of fire, because these additives increase the mechanical strength of the intumescing layer and/or prevent it from dripping off, thereby maintaining or reinforcing the insulating effect of the foam.

According to the invention, a compound containing phosphorus is used as an ash-crust stabilizer, which is selected from among the salts or esters of phosphorus oxyacids. The phosphorus oxyacids are used because the spectrum thereof is very large. The phosphorus oxyacids are phosphoric acid ($H_3PO_4$) (also designated as ortho phosphoric acid), diphosphoric acid ($H_4P_2O_7$) (also designated as pyrophosphoric acid), triphosphoric acid ($H_5P_3O_{10}$), polyphosphoric acid ($H_{n+2}P_nO_{3n+1}$), poly metaphosphoric acid (($HPO_3)_n$), hypophosphoric acid ($H_4P_2O_6$) (also diphosphoric (IV) acid), diphosphoric (III, V) acid ($H_4P_2O_6$), phosphonic acid ($H_3PO_2(2)$, wherein the number in parenthesis signifies the maximum basicity of the acid, if this differs from the total number of H atoms in the formula) (also designated as phosphorous acid), diphosphonic acid ($H_4P_2O_5(2)$, wherein the number in parenthesis signifies the maximum basicity of the acid, if this differs from the total number of H atoms in the formula) (also designated as diphosphoric acid), and phosphinic acid ($H_3PO_2(1)$, wherein the number in parenthesis signifies the maximum base-ness of the acid, if this differs from the total number of H atoms in the formula).

The following can be mentioned as examples of phosphoric acid compounds: monoammonium phosphate, diammonium phosphate, ammonium phosphate, ammonium polyphosphate, melamine phosphate, melamine polyphosphate, melamine resin phosphates, potassium phosphate, polyol phosphates, such as, for instance, pentaerythritol phosphate, glycerin phosphate, sorbitol phosphate, mannitol phosphate, dulcitol phosphate, neopentyl glycol phosphate, ethylene glycol phosphate, dipentaerythritol phosphate and the like. A polyphosphate or an ammonium polyphosphate is preferably used as a phosphoric acid compound. Melamine resin phosphates should thereby be understood as compounds like conversion products from Lamelite C (melamine formaldehyde resin) with phosphoric acid.

The compound containing phosphorus is contained in a quantity of approximately 5 to 15% by weight, preferably 7 to 15% by weight, especially preferably 9 to 11% by weight, related to the total weight of the composition.

The stability of the ash crust can be increased even further by also adding other ash-crust stabilizers to the composition.

According to the invention, the composition contains inorganic fibers as an additional ash-crust stabilizer, in particular short cut fibers. Suitable fibers are glass fibers, in particular made of E-glass, silicate fibers, or mineral wool fibers. The fibers preferably have a length of 2 mm to 12 mm, more preferably 4 mm to 8 mm and especially preferably 6 mm.

The inorganic fibers are preferably contained in a quantity of approximately 0.5 to 4% by weight, preferably 1% by weight to 3% by weight, especially preferably 1% by weight to 2.5% by weight, related to the total weight of the composition.

The inventors have now surprisingly discovered that a synergistic effect is achieved precisely through the combination of physically acting expanding agents, compounds containing phosphorus, and inorganic fibers, and that the dispersing or the falling out of the ash crust can be reduced considerably as compared to other fire protection additives and in particular as compared to the individual substances. Without the present invention being tied to a theory or restricted thereby, the inventors assume that the synergistic effect is based on the fact that the glass fibers stick together because of the compound containing phosphorus, which vitrifies at the temperatures prevalent in the case of fire, and the expanded graphite particles are permanently incorporated into the structure. Despite the simplified composition, very hard and stable ash crusts can be formed because of this.

In addition, other fire protection additives, in particular those that cause a chemical intumescence and those that have an ablative effect, can be contained in the composition. "Chemical intumescence" is designated as the formation of a voluminous, insulating ash layer via compounds that are coordinated with each other, which react with each other under the effect of heat. In general, these are a carbon supplier, an acid producer, and an expanding agent.

An organic compound which leaves behind a carbon skeleton as a result of incomplete combustion and does not completely combust to form carbon dioxide and water (carbonization) is designated as a "carbon supplier". These compounds are also designated as "carbon skeleton formers". A compound which forms a non-volatile acid under the effect of heat, i.e., above approximately 150° C., for example, by decomposition and thereby acts as a catalyst for carbonization is designated as an "acid producer". In addition, it can contribute to lowering the viscosity of the molten mass of the binder. The term "dehydrogenation catalyst" is used synonymously with it. An "expanding agent" is a compound which decomposes at elevated temperatures with the development of inert, i.e., non-combustible gases and the carbon skeleton formed by the carbonization and, as the case may be, the softened binder swells to form a foam (intumescence). This term is used synonymously with "gas former".

As the case may be, the compositions according to the invention can contain other common additives, such as softening agents, fillers, pigments, additives for adjusting the rheological properties, thickening agents, dispersing agents, emulsifying agents, biocides, fungicides, preservatives and anti-ageing agents, anti-freezing agents, wetting agents, anti-foaming agents, and/or skin formation inhibitors. These additional additives are commercially available products which are known to a person skilled in the art in the field of sealing masses for construction purposes in particular.

Fillers typically used in sealing masses and those known to a person skilled in the art can be used as fillers as long as they do not react with acids.

The following can be mentioned as examples of fillers: barium sulfate, quartz, talcum, kaolin, calcium sulfate, and/or calcium silicate. The filler can be used alone or as a mixture of two or more fillers. The filler is preferably a spherical, in particular coarse-grained filler.

In a preferred embodiment of the invention, the composition contains as a filler a spherical filler with a grain size between 20 µm and 500 µm, preferably between 40 µm and 200 µm. The spherical filler is especially preferably a light-weight filler, such as hollow glass spheres, foam glass spheres, fly ash, ceramic hollow spheres, glass spheres and/or sands.

The use of spherical fillers, in particular light-weight fillers, is advantageous in several aspects. The use thereof can among other things reduce the density, improve the workability of the mass, reduce the shrinkage to a minimum and lower the costs of the composition.

However, to achieve better workability, it is necessary for the spherical fillers to be considerably larger than the other solid components contained in the composition with the exception of the physically acting expanding agent. Completely unexpectedly, the size of the physically acting expanding agent has no impact on the workability of the composition, not even with a high level fiber content. Therefore, according to the invention, the spherical solid features a grain size that is larger than the grain size of the other solids contained in the composition.

With the exception of the physically acting expanding agent, the solid components preferably have a grain size of less than 10 µm so that, according to the invention, the spherical filler has a grain size greater than 10 µm. The grain size of the spherical filler is preferably in a range of 20 µm to 500 µm, more preferably between 30 µm and 300 µm and especially preferably between 40 µm and 150 µm.

The fillers are preferably contained in a quantity of approximately 5 to 15% by weight, more preferably 8 to 12% by weight, especially preferably 9 to 11% by weight related to the total weight of the composition.

The composition can preferably contain iron oxide, titanium dioxide, zinc sulfide, zinc oxide and/or organic or inorganic color pigments as pigments.

The composition according to the invention can contain for example highly dispersed silicic acid, bentonites, polyacrylates and/or cellulose ether as additives for adjusting theological [sic] properties.

The additives can be contained in a quantity of approximately 0.2 to 5% by weight, preferably 0.2 to 3% by weight, related to the total weight of the composition.

The composition according to the invention makes it possible to make a sealing mass available, which is shelf-stable over a longer period of time, even at elevated temperatures. The sealing mass is suitable in particular for fire and smoke seals or barriers of openings, cable and pipe feed-throughs in walls, floors and/or ceilings, of joints between parts of ceilings and walls, between masonry openings and structural components that are to be built, such as window and door frames, between ceilings and walls, and between exterior walls and curtain-type façades of buildings. They thereby satisfy the purpose of heat insulation and/or fire protection, wherein they meet the requirements of fire protection provisions of various countries.

The following examples serve to further explain the invention.

EXEMPLARY EMBODIMENTS

Three compositions were produced with the components shown in Table 1 and filled into cartridges. In terms of the additive, they are additives that are typical for sealing masses, such as anti-foaming agents, emulsifying agents, means for adjusting the pH value, fungicides, anti-freezing agents, dyes/pigments, softening agents and the like.

To assess the crust strength, plates with a thickness of approx. 5 mm were produced from the masses and hardened for 2 weeks at room temperature and another 2 weeks at 50° C. Discs with a diameter of 50 mm were punched out of these plates. These discs were incinerated for 30 minutes on a metal plate at 600° C. Afterwards, the ash bodies that developed were crushed with a spatula and the strength was assessed. An assessment with the value of 1 signifies a very low ash crust stability and an assessment with the value of 6 signifies a very high ash crust stability.

The following table shows the components and the quantities thereof in the comparative composition (comparative example) and the compositions according to the invention (Examples 1, 2). Furthermore, the table shows the results of the assessment of the free expansion at 600° C., the crust strength after incineration at 600° C. and shelf life at room temperature (RT).

As is evident, the comparative composition and the compositions according to the invention show a comparable free expansion at 600° C., however, both the crust stability as well as the shelf life of the compositions according to the invention are better than that of the comparative composition.

|  | Comparative Example | Example 1 | Example 2 |
|---|---|---|---|
| Acrylate dispersion (65% acrylate and 35% water) | 31.0% by weight | 39.0% by weight | 39.0% by weight |
| Alkyd resin | 4.1% by weight | | |
| Softening agent/tackifier (Indopol) | 6.0% by weight | | |
| Additives | 3.9% by weight | 6.0% by weight | 6.0% by weight |
| Calcium carbonate | 18.0% by weight | | |
| Kaolin (Capsil 2004) | | 37.0% by weight | 27.0% by weight |
| Foam glass spheres (Poraver 40-125 μ) | | | 10.0% by weight |
| Expandable graphite | 5.5% by weight | 5.5% by weight | 5.5% by weight |
| Talc. | 8.0% by weight | | |
| Zinc borate | 12.0% by weight | | |
| Glass fibers | 1.2% by weight | 2.2% by weight | 2.2% by weight |
| Ammonium polyphosphate | 10.0% by weight | 10.0% by weight | 10.0% by weight |
| Cellulose to which 4% water has been added | 0.3% by weight | 0.3% by weight | 0.3% by weight |
|  | 100.0% by weight | 100.0% by weight | 100.0% by weight |
| Free expansion at 600° C. | 1:15 | 1:15 | 1:15 |
| Crust strength after incineration at 600° C. | 5 | 6 | 6 |
| Shelf life in cartridges at RT | 9 months | 18 months | 18 months |

The invention claimed is:

1. A composition, comprising:
   (a) a binder based on an aqueous- or solvent-based polymer dispersion;
   (b) fire protection additives comprising:
      (i) a physically acting expanding agent,
      (ii) a compound containing phosphorus, selected from the group consisting of a salt of a phosphorus oxyacid and an ester of a phosphorus oxyacid, in a quantity of approximately 5 to 15% by weight relative to the total weight of the composition; and
      (iii) free glass fibers having a length of 2 to 12 mm; and
   (c) an acid-resistant, inorganic filler selected from the group consisting of kaolin, $BaSO_4$, $CaSO_4$, and mixtures thereof;
   provided that the composition is free of zinc borate and acid-labile fillers.

2. The composition according to claim 1, wherein the phosphorus oxyacid is selected from the group consisting of orthophosphoric acid, pyrophosphoric acid, triphosphoric acid or polyphosphoric acid.

3. The composition according to claim 2, wherein the compound containing phosphorus is selected from the group consisting of monoammonium phosphate, diammonium phosphate, ammonium phosphate, melamine resin phosphates, potassium phosphate, melamine phosphate and melamine polyphosphates.

4. The composition according to claim 1, wherein the physically acting expanding agent is selected from among graphite intercalation compounds and/or sheet silicate intercalation compounds.

5. The composition according to claim 4, wherein the physically acting expanding agent is selected from among graphite intercalation compounds.

6. The composition according to claim 1, wherein the binder based on an aqueous- or solvent-based polymer dispersion comprises an acrylate copolymer dispersion.

7. The composition according to claim 1, which also contains additional additives and/or fillers.

* * * * *